United States Patent [19]

Regester

[11] Patent Number: 4,669,031
[45] Date of Patent: May 26, 1987

[54] LIGHT BOX FOR PHOTOGRAPHIC USE

[76] Inventor: Gary L. Regester, P.O. Box 451, Silver Plume, Colo. 80476

[21] Appl. No.: 224,344

[22] Filed: Jan. 12, 1981

[51] Int. Cl.$^4$ .............................................. G03B 15/02
[52] U.S. Cl. ..................................... 362/16; 362/362; 362/367
[58] Field of Search ................. 362/8, 16, 17, 18, 154, 362/362, 367; 135/4 R, 4 C

[56] References Cited

U.S. PATENT DOCUMENTS 2,831,104  4/1958  Brandt ..................................... 362/16
3,834,410  9/1974  Leibel .................................. 135/4 R Primary Examiner—Donald P. Walsh
Attorney, Agent, or Firm—Townsend and Townsend

[57] ABSTRACT

A photographic light box comprised of a housing having a side wall with a pair of opposed ends, one of the ends being larger than the other end and the side wall progressively increasing in cross section as the smaller of the two ends is approached. A panel capable of transmitting diffused light is secured to the side wall across the larger end of the housing, the smaller end being open to receive a light source including a lamp disposed within the housing and capable of being energized to produce light. The housing has a plurality of flexible rods extending along the side wall at spaced locations thereon and the ends of the rods near the smaller end of the housing are inserted into holes in spaced block carried by a strap surrounding the light source as the light source extends into the opening of the housing. The rods are bent to permit insertion of the ends of the rods into the block and this bending of the rods provides a bias force to cause the housing to expand and substantially stretch the light diffusing panel at the larger end of the housing. The housing can be collapsed when not in use and rolled into a compact shape for insertion into a tube for shipment or storage.

14 Claims, 5 Drawing Figures

LIGHT BOX FOR PHOTOGRAPHIC USE

This invention relates to improvements in light boxes for use by photographers in providing a source of diffused light when photographing a subject.

BACKGROUND OF THE INVENTION

When photographing a subject in a studio, a photographer oftentimes uses a light box which is comprised of a hollow housing having a constant or intermittent source of light inside of the housing. The lamp generates light which passes through an end panel or panels which effectively diffuses the light and provides a uniform distribution of light on the subject to be photographed.

For the most part, light boxes of conventional construction are bulky and are not collapsible into a compact shape for storage or for shipment. Generally, those that are collapsible for this purpose have braces and other supporting members across the interior of the housing and in the path of the light from the light source. These interfering structures, therefore, reduce the quality of light from the light source and reduce the effectiveness of operation of the light box itself. In general, there has been no light box construction which permits efficient light distribution yet allows the light box to be collapsed quickly and easily for shipment or storage.

SUMMARY OF THE INVENTION

The present invention satisfies the aforesaid need by providing an improved light box of the type described which is comprised of a flexible housing of fabric or similar material which is collapsible from an expanded, operative condition to a compact condition suitable for insertion into a tube for shipment or storage. The light box, when expanded, also permits light generated by a light source near one end of the light box to pass through the latter and out of a light diffusing panel at its opposite end without interference from support structure within the housing. Thus, substantially all of the light generated in the housing can be used for illuminating the subject to be photographed.

The primary object of the present invention is to provide an improved light box for use by photographers wherein the light box is collapsible so that it can be folded or rolled into a compact form for insertion into a carrying case or tube, yet the light box can be readily assembled for use without any special skills on the part of the user.

Still another object of the present invention is to provide a portable light box in which the interior of the light box has no interfering support structure between a light source in the housing and the light diffusing end panel thereof to thereby permit maximum amount of light from the light source to pass through the light diffusing panel to thereby eliminate a common drawback of conventional light boxes of this type.

Other objects of this invention will become apparent as the following specification progresses, reference being had to the accompanying drawings for an illustration of the invention.

IN THE DRAWINGS

Figure 1:
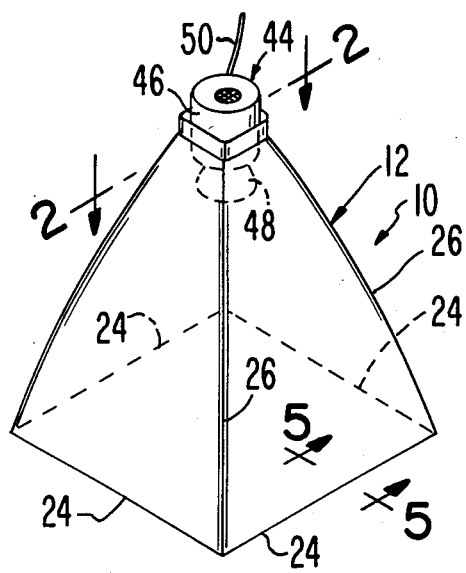
FIG. 1 is a perspective view of the improved portable light box of the present invention showing the way a light source is coupled to the light box near one end thereof.

The portable light box of the present invention is broadly denoted by the numeral 10 and includes a collapsible housing 12 which, for purposes of illustration, has four sides 14, 16, 18 and 20 of fabric material. Each of the sides is trapezoidal in shape to present a first end margin 22 (FIG. 3), a second end margin 24 (FIG. 1), and a pair of opposed side margins 26 (FIG. 1). Side margins 26 of each of the sides converge as the corresponding end margin 22 is approached. At end margin 22, side margins 26 of each side are spaced apart.

Figure 5:
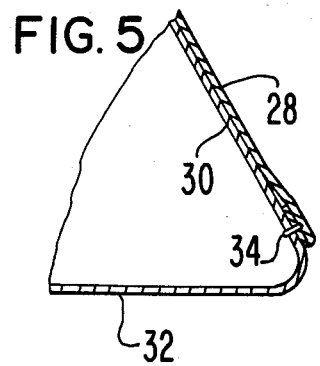
FIG. 5 is a cross-sectional view taken along line 5—5 of FIG. 2.

The side margins 26 of the adjacent sides of housing 12 are interconnected in some suitable manner so that the sides form a one-piece construction for the external portion of housing 12. The housing is formed from an external fabric layer 28 and an internal fabric layer 30. The fabric material for layers 28 and 30 can be of any suitable type such as a spinnaker sailcloth which, if white or off-white, is translucent. Black sailcloth prevents camera flare. The fabric of layer 28 typically is black and is opaque to light within the housing 12. The material of fabric layer 30 is typically reflective in character, and layer 30 essentially lines the interior surfaces of sides 14, 16, 18 and 20. Since the material of layer 30 is reflective, light emanating within housing 12 is essentially reflected off layer 30 and outwardly toward the large end of the housing. This large end is closed by a cover panel 32 which is typically the same material as that of layer 30. Layer 32 is secured by stitching 34 (FIG. 5) to layer 28 near the end margin adjacent to the large end of housing 12. Also, layer 30 defines substantially the entire inner surface of sides 14, 16, 18 and 20.

At each of the side margins 26 of adjacent sides 14, 16, 18 and 20, there is an elongated loop 36 (FIG. 4) formed by doubling the material forming the sides and closing the loop by stitching 38. The loop, therefore, presents a passage 40 for removably receiving a flexible, solid rod 42, such as of fiberglass or other resilient material. Each loop 36 extends from a location near margin 22 (FIG. 3) to the opposite end margin 24 of housing 12. At the large end of the housing, each loop is closed so that the corresponding rod 42 is prevented from passing out of the corresponding passage at this end. The length of each rod 42 is such that it projects out of the corresponding passage 40 in the manner shown in FIG. 3 near margin 22.

Housing 12 is adapted to be used with a light source 44 which, for purposes of illustration, includes a cylindrical outer housing 46 having means for mounting a lamp 48 or light bulb at one end thereof. The lamp is electrically actuated when a cable 50 leading away from housing 46 is coupled to a source of electrical power. Housing 46 has a vent opening 52 in the opposite end thereof to allow heat generated by lamp 48 to pass through the housing and exit therefrom to the atmosphere.

Light source 44 is adapted to be received within the opening at the smaller end of housing 12 so that lamp 48 is within the housing, such as in the dash-line position of FIG. 1. Means is provided for coupling housing 46 of light source 44 to housing 12. For purposes of illustration, this coupling means includes a flexible strap 54 having a number of generally rigid blocks 56 coupled thereto, the strap having a buckle 58 for joining the ends of the strap in the manner shown in FIG. 2 so that the strap encircles housing 46.

Each block 56 is typically of solid material, such as metal or plastic, and the block has a rectangular passage 60 (FIG. 3) therethrough for shiftably receiving strap 54, the passage being between the sides and ends of the block. The block typically is of rectangular shape although it can be of other shapes if desired.

Figure 2:
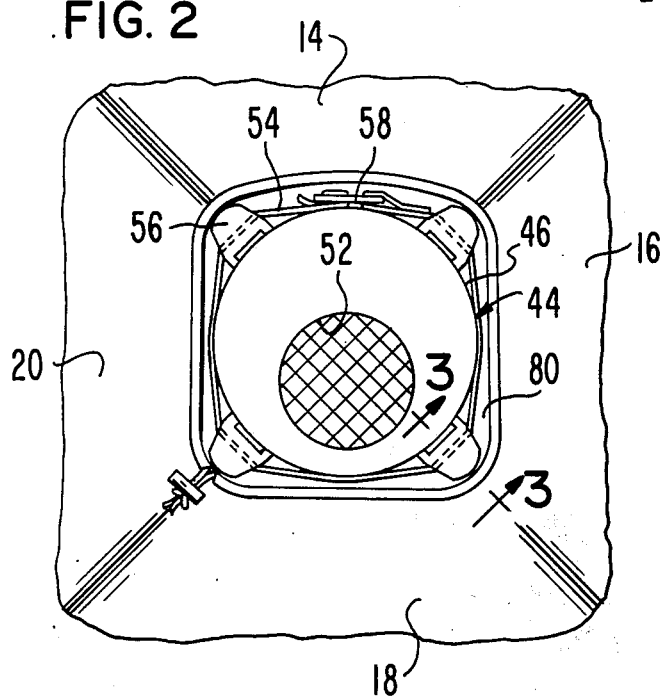
FIG. 2 is an enlarged, fragmentary end elevational view of the light box looking in the direction of line 2—2 of FIG. 1.
Figure 3:
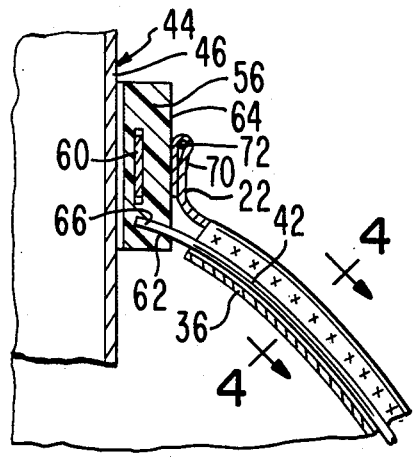
FIG. 3 is a cross-sectional view taken along line 3—3 of FIG. 2.
Figure 4:
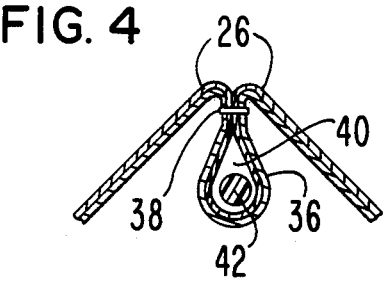
FIG. 4 is an enlarged cross-sectional view taken along line 4—4 of FIG. 3.

Each block 56 further has a hole 62 extending into the block from one generally flat face 64 thereof as shown in FIG. 3. Hole 62 is adapted to removably receive the adjacent end 66 of the corresponding rod 42. Thus, if there are four rods 42, there will be four blocks 56, one block for each rod, respectively. Moreover, the blocks will be arranged about housing 46 at locations corresponding to the corners of housing 12 as shown in FIG. 2.

Each passage 62 is angled with reference to the plane of flat face 64 of the corresponding block 56. Moreover, each hole 62 is at an angle with reference to the normal longitudinal axis of the corresponding rod 42 when the rod is in its passage 40 and when light source 44 is in its operative position relative to housing 12 as shown in FIG. 3. Thus, the rod has to be bent slightly to be aligned with the hole for insertion into the hole itself. This feature requires a resilient rod 42 and also assures that the rod 42 will be biased outwardly along its entire length as it extends through the corresponding passage 40, thereby causing the sides of the housing to flare outwardly and essentially to "inflate" the housing into the desired expanded shape as shown in FIG. 1. Thus, no internal cross-braces or rods are required. When housing 12 is "inflated" by rods 42, the rods and thereby side margins 26 of the housing will be curved as shown in FIGS. 1 and 3.

The small margins 22 of the sides of housing 12 are also doubled upon themselves to form loops 70 (FIG. 3) which receive a flexible tie member 72, such as a lace, which can be pulled to draw margins 22 against the outer flat faces 64 of blocks 56. Member 72 can then be tied at the ends so that margins 22 will snugly fit about blocks 56 as shown in FIG. 2. When so arranged, margins 22 will still be slightly spaced from the outer surface of housing 46 to present openings 80 allowing heat generated by the operation of lamp 48 to pass out of housing 12 to the atmosphere.

With housing 12 and light source 44 coupled together in the manner shown in FIG. 1, light box 10 can then be mounted in a suitable manner to project light in a diffused manner onto a subject to be photographed. Typically, a bracket (not shown) will be coupled with housing 46 of light source 44 to mount light box 10 an operative position. Then, when lamp 48 is energized, light from the lamp will be directed through end wall 32 and be diffused thereby and such diffused light will then strike the object to by photographed. The light will be uninterrupted in the space between lamp 48 and end wall 32.

Light box 10 can be dismantled and collapsed so that it can be carried in a minimum of space. Generally, tie member 72 is untied to allow margins 22 to separate from blocks 56. Then, after loosening strap 54 ends 66 of rods 42 are removed from holes 62 of blocks 56, allowing housing 12 to collapse and permitting light source 44 to be separated from the housing. Rods 42 can then be removed from passages 40 and then housing 12, because it is of flexible or foldable material, can be rolled into an elongated generally cylindrical shape having a diameter of about 2 to 3 inches. The housing, in its cylindrical form, can then be inserted into a fabric or plastic tube of about the same diameter for carrying purposes. Rods 42 can also be inserted in the tube or can be left in passages 40 when the housing 12 is rolled into a cylindrical shape.

Strap 54 can then be removed from the exterior of housing 46 and stored in the tube which carries housing 12. Light source 44 will then be carried separately from the tube containing rolled-up housing 12; thus, the light box itself reduces to a minimum volume for shipment and storage.

I claim:

1. A light box for photographic use comprising: a housing having a collapsible side wall and a pair of opposed ends, the housing have a progressively decreasing cross-section extending from one end of the housing to the opposite end thereof, the housing having an opening at said opposite end; a light transmitting panel secured to the side wall and extending across said one end of the housing, said panel being operable to diffuse light passing therethrough from the interior of the housing; a plurality of resilient rods coupled to the side wall at spaced locations thereon, the rods extending between the ends of the housing; a light source extending into said opening at the opposite end of the housing and including a lamp for illuminating the interior of the housing so that light from the lamp can pass through and be diffused by said panel at said one end of the housing; and means releasably coupling the ends of the rods to the light source to thereby couple the housing to the light source, said coupling means being operable to bias the rods away from each other and outwardly of the interior of the housing to cause the side wall to expand and to project outwardly from the light source in its expanded condition.

2. A light box as set forth in claim 1, wherein the region between lamp and said side panel is free of structure.

3. A light box as set forth in claim 1, wherein said side wall comprises number of interconnected side panels, there being a rod at the junction of each pair of side panels, respectively.

4. A light box as set forth in claim 3, wherein said housing has means defining a tubular passage at the junction of each pair of adjacent side panels, respectively, each rod being removably received within a respective passage.

5. A light box as set forth in claim 4, wherein the side panels of the housing are formed from a flexible material capable of being stitched, the material being folded upon itself at the junction of each pair of adjacent side panels to form a loop, and including stitching at the ends of the loop, said stitched loop defining the passage defining means at each junction, respectively.

6. A light box as set forth in claim 1, wherein said coupling means comprises a plurality of spaced blocks, and means coupling the blocks to the light source, each block having a hole therein for receiving the end of a respective rod.

7. A light box as set forth in claim 6, wherein said block coupling means comprising a strap coupled with each block, respectively, and removably coupled to said light source.

8. A light box as set forth in claim 6, wherein the hole in each block extends at an angle relative to the longitudinal axis of the housing.

9. A light box as set forth in claim 8, wherein the hole of each block is angularly disposed relative to the longitudinal axis of the corresponding rod so that the rod must be bent to permit insertion of the end of the rod into the respective hole, said bending of the rod being operable to force the major portion of the rod outwardly of the interior of the housing to thereby bias the side wall of the housing outwardly and substantially stretch the panel at said one end of the housing.

10. A light box as set forth in claim 1, wherein is included a tie-down member coupled to the side wall at said opposite end thereof, said tie-down member adapted to be removably tied to the light source.

11. A light box as set forth in claim 1, wherein the housing is capable of being rolled into an elongated member when the side wall is collapsed, and a tube for receiving the rolled up housing.

12. A light box as set forth in claim 1, wherein the housing is formed from sailcloth material.

13. A light box as set forth in claim 1, wherein said side wall is formed from black material and said end panel is formed from reflective material.

14. A light box as set forth in claim 1, wherein said rods are formed from fiberglass material.

* * * * *